(12) United States Patent
Chambers et al.

(10) Patent No.: US 12,070,023 B2
(45) Date of Patent: Aug. 27, 2024

(54) FISHING ROD WITH SHAPE MEMORY MATERIAL

(71) Applicant: Chambers Technology Inc., Maple Grove, MN (US)

(72) Inventors: Jeffrey W. Chambers, Maple Grove, MN (US); Bradley T. Chambers, Mackinac Island, MI (US)

( * ) Notice: Subject to any disclaimer, the term of this patent is extended or adjusted under 35 U.S.C. 154(b) by 46 days.

(21) Appl. No.: 16/795,054

(22) Filed: Feb. 19, 2020

(65) Prior Publication Data

US 2020/0260706 A1 Aug. 20, 2020

Related U.S. Application Data

(60) Provisional application No. 62/926,886, filed on Oct. 28, 2019, provisional application No. 62/807,296, filed on Feb. 19, 2019.

(51) Int. Cl.
*A01K 87/00* (2006.01)

(52) U.S. Cl.
CPC .......... *A01K 87/00* (2013.01); *A63B 2209/14* (2013.01)

(58) Field of Classification Search
CPC ...... A01K 87/04; A01K 87/007; A01K 87/00; A01K 99/00; B21B 2205/04; B21B 1/38
USPC ....................................................... 43/18.1 R
See application file for complete search history.

(56) References Cited

U.S. PATENT DOCUMENTS

| | | | | |
|---|---|---|---|---|
| 1,371,261 A | * | 3/1921 | Price | A01K 87/00 43/18.1 R |
| 1,478,643 A | * | 12/1923 | Alah | A01K 87/04 43/24 |
| 1,625,510 A | * | 4/1927 | Tredwell | A01K 87/025 403/52 |
| 2,017,303 A | * | 10/1935 | Bear | A01K 87/00 43/18.1 R |
| 2,196,742 A | * | 4/1940 | Cowdery | A01K 87/00 43/18.1 R |
| 2,334,646 A | * | 11/1943 | Price | A01K 87/005 43/18.1 R |
| 2,600,629 A | * | 6/1952 | Feierabend | A01K 87/02 403/305 |
| 2,650,447 A | * | 9/1953 | Johnson | A01K 87/04 43/24 |
| 3,170,721 A | * | 2/1965 | Wells | A01K 87/02 403/377 |

(Continued)

FOREIGN PATENT DOCUMENTS

| | | |
|---|---|---|
| JP | H0728634 B2 * | 4/1995 |
| JP | H8-107738 A | 4/1996 |

(Continued)

OTHER PUBLICATIONS

PCT International Search Report & Wriiten Opinion, PCT/US2020/018868, mailed Jun. 12, 2020, 8 pages.

*Primary Examiner* — Darren W Ark
*Assistant Examiner* — Zoe Tam Tran
(74) *Attorney, Agent, or Firm* — Dicke, Billig & Czaja, PLLC

(57) ABSTRACT

Fishing rods that have a rod body comprising a shape memory material. The shape memory material useful with the rod body of the fishing rod can be a shape memory metal, a metal alloy, a shape memory polymer, or some combination of carbon fiber, fiberglass and metal, metal alloy, or polymer with shape memory attributes.

19 Claims, 12 Drawing Sheets

(56) References Cited

U.S. PATENT DOCUMENTS

| | | | | |
|---|---|---|---|---|
| 3,629,029 A * | 12/1971 | Holahan | ................ | A01K 87/00 156/189 |
| 3,830,008 A * | 8/1974 | Johnson | ................ | A01K 87/02 43/18.1 CT |
| 4,015,360 A * | 4/1977 | Herter | ................ | A01K 87/00 273/DIG. 7 |
| 4,061,806 A * | 12/1977 | Lindler | ................ | A01K 87/00 428/34.5 |
| 4,178,713 A * | 12/1979 | Higuchi | ................ | A01K 87/00 428/36.1 |
| 4,697,375 A * | 10/1987 | Mills | ................ | A01K 87/04 43/17.5 |
| 5,090,150 A * | 2/1992 | Pirazzini | ................ | A01K 87/04 43/24 |
| 5,338,604 A * | 8/1994 | Yasui | ................ | A01K 87/00 428/107 |
| 5,964,056 A | 10/1999 | Grice | | |
| 5,979,103 A * | 11/1999 | Sunaga | ................ | A01K 87/005 43/18.1 HR |
| 6,301,821 B1 * | 10/2001 | Suzue | ................ | B29C 70/32 43/18.1 R |
| 7,584,571 B2 | 9/2009 | Ryan | | |
| 8,001,716 B1 | 8/2011 | Lepage et al. | | |
| 8,276,309 B2 | 10/2012 | Al-Mutairi | | |
| 8,590,205 B2 * | 11/2013 | Huang | ................ | A01K 87/08 43/23 |
| 9,949,466 B2 * | 4/2018 | Noda | ................ | A01K 87/02 |
| 10,182,562 B2 | 1/2019 | Noda | | |
| 10,383,319 B2 | 8/2019 | Nakahata et al. | | |
| 2002/0152668 A1 | 10/2002 | Lybarger | | |
| 2003/0235671 A1 * | 12/2003 | Sano | ................ | B32B 5/28 428/36.91 |
| 2004/0200123 A1 * | 10/2004 | Whiting | ................ | A01K 87/00 43/18.5 |
| 2004/0244266 A1 * | 12/2004 | Maca | ................ | A01K 87/00 43/18.1 CT |
| 2005/0223617 A1 | 10/2005 | Morita et al. | | |
| 2009/0320352 A1 * | 12/2009 | Underwood | ................ | A01K 87/00 43/24 |
| 2011/0083356 A1 * | 4/2011 | Rupp | ................ | A01K 87/025 43/27.4 |
| 2012/0060403 A1 * | 3/2012 | LoPresti | ................ | A01K 87/04 43/24 |
| 2012/0174467 A1 * | 7/2012 | Iwanari | ................ | A01K 87/00 43/18.1 R |
| 2015/0057587 A1 * | 2/2015 | Walsh | ................ | F41H 1/02 602/16 |
| 2015/0272098 A1 * | 10/2015 | Nakahata | ................ | A01K 87/04 43/24 |
| 2016/0286770 A1 * | 10/2016 | Yokoyama | ................ | B41J 3/4073 |
| 2016/0286772 A1 * | 10/2016 | Gnann | ................ | A01K 87/04 |
| 2016/0353723 A1 | 12/2016 | Miller et al. | | |
| 2017/0020118 A1 * | 1/2017 | Anderson | ................ | A01K 87/04 |
| 2017/0360019 A1 | 12/2017 | Tate | | |
| 2018/0007877 A1 * | 1/2018 | DeJong | ................ | B23K 26/355 |

FOREIGN PATENT DOCUMENTS

| | | | |
|---|---|---|---|
| JP | 09-084491 A | | 3/1997 |
| JP | 09-191800 A | | 7/1997 |
| JP | 0826481 A2 | * | 3/1998 |
| JP | 10-085373 A | | 4/1998 |
| JP | 2000-83524 A | | 3/2000 |
| JP | 2001037378 A | * | 2/2001 |
| JP | 2004-73047 A | | 3/2004 |
| JP | 2005013111 A | | 1/2005 |
| JP | 2006-42762 A | | 2/2006 |
| JP | 3838558 B2 | * | 10/2006 |
| JP | 2007289067 A | | 11/2007 |
| JP | 2007289103 A | | 11/2007 |
| KR | 10-2012-0106230 A | | 9/2012 |
| WO | WO-0016613 A1 | * | 3/2000 ............ A01K 87/00 |

\* cited by examiner

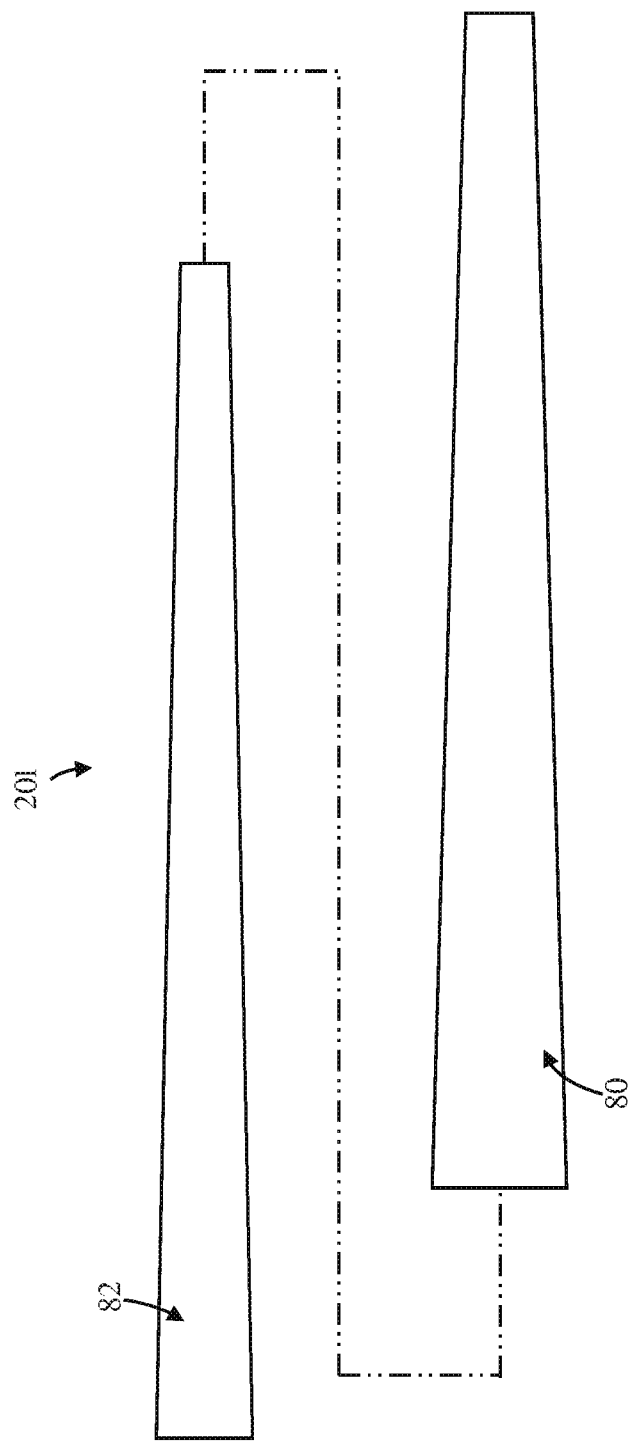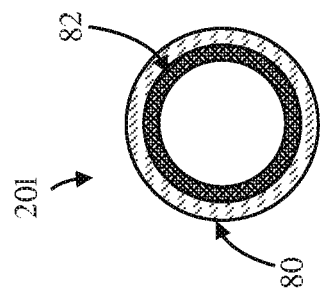
FIG. 9A
FIG. 9B

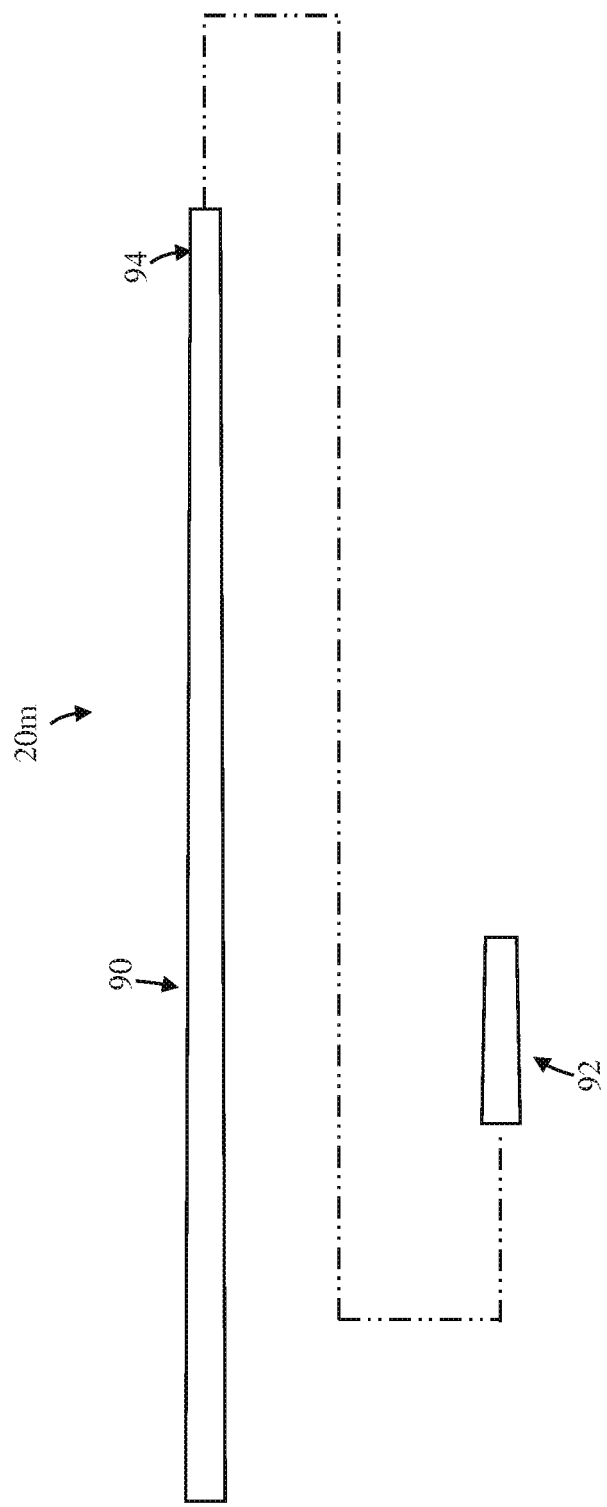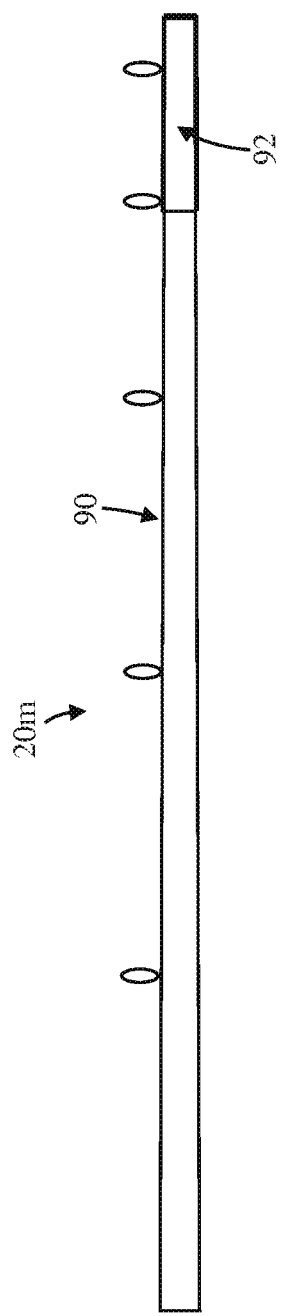
FIG. 10A
FIG. 10B

FISHING ROD WITH SHAPE MEMORY MATERIAL

CROSS REFERENCE TO RELATED APPLICATIONS

This application claims the benefit of the filing date of U.S. Provisional Patent Application Ser. No. 62/807,296, filed Feb. 19, 2019, entitled "FISHING ROD", and claims the benefit of the filing date of U.S. Provisional Patent Application Ser. No. 62/926,886, filed Oct. 28, 2019, entitled "FISHING ROD", the entire teachings of each of which are incorporated herein by reference.

BACKGROUND

The present disclosure is directed to fishing rods. More particularly, it relates to fishing rods with high strength and responsiveness, and methods for making the same.

Basic fishing rod and reel constructions have been known and used by sport anglers for a considerable period of time. As sport fishing has become more sophisticated, modifications of the equipment have become increasingly important in order to optimize one's experience and ability to catch different species of fish under various conditions.

Avid anglers strongly prefer a fishing rod that is lightweight, durable, and exhibits a desired level of action, stiffness or flexibility (or "responsiveness"). For example, the stiffness or flexibility to enable casting and placing a lure in the water at a desired location, and the strength and structural robustness to lift the catch out of the water. The term "action" is used to describe how much of the rod bends or deflects when a force is applied at a tip of the rod. A slow action rod deflects less than one that is a fast or moderate action rod of the same type. The responsiveness of a rod is generally in reference to the ability of the entire rod to flex under load and then return to an original shape or state when the load is removed or released.

A fishing rod typically includes one or more rod bodies carrying line guides (e.g., metal rings) or forming an inner line guide passageway. In some instances, a single, long rod body is provided; with other fishing rod designs, two or more rod bodies are provided and connected to one another. The rod body can be solid or hollow. Regardless, the single rod body or connected rod bodies extend from a handle or butt end (at which a fishing reel is attached) to a tip end, generally tapering in diameter from the handle end to the tip end. The rod body or rod bodies are normally formed of a reinforced fiber material such as fiberglass or carbon fiber sheets. While well-accepted, conventional fishing rod body constructions do not meet all performance characteristics desired by skilled anglers.

SUMMARY

The inventors of the present disclosure have recognized a need to address one or more of the above-mentioned problems.

Some aspects of the present disclosure relate to fishing rods including a rod body. A construction of the rod body includes, in some embodiments, a shape memory material, such as a shape memory metal, metal alloy, shape memory polymer, or some combination of carbon fiber, fiberglass and metal, metal alloy, or polymer with shape memory attributes.

With some fishing rods, and in particular rod bodies, of the present disclosure, the shape memory material provides or exhibits the same performance properties as a conventional (e.g., fiber glass) fishing rod, but with a lighter and/or smaller construction (e.g., by adding a shape memory material, the rod bodies of the present disclosure can be made smaller or lighter and exhibit the same performance characteristics as a larger or heavier fishing rod body made of conventional or existing fishing rod body materials). A user will thus experience less fatigue using the fishing rods of the present disclosure as compared to conventional fishing rods, and will beneficially be able to fish for longer periods of time.

Alternatively or in addition, the fishing rods, and in particular rod bodies, of the present disclosure can exhibit improved or longer casting performance properties in some embodiments as compared to conventional fishing rods. For example, the shape memory material(s) incorporated into the rod bodies of the present disclosure will inherently self-act to return to or toward a pre-set or fixed natural orientation or shape following removal of an applied load. When, for example, the rod body is configured to naturally assume a linear or straight shape when not under load, as energy is applied to the rod body during a back cast motion, the shape memory material will inherently self-return to or toward the natural or normal shape, thus multiplying the force applied onto the fishing rod line with the forward casting motion. These characteristics can, for example, provide for longer casting of the fishing lure as compared to conventional fishing rods.

Alternatively or in addition, the fishing rods, and in particular rod bodies, of the present disclosure can exhibit more accurate casting properties as compared to conventional fishing rods in some embodiments. For example, the added force with the forward casting motion as described above may allow the user to point the tip of the fishing rod at the desired location while requiring less force by the user to access the desired location thereby increasing accuracy of lure delivery as compared to conventional fishing rods.

Alternatively or in addition, the fishing rods, and in particular rod bodies, of the present disclosure can provide an increased ability to retrieve a caught fish as compared to conventional fishing rods in some embodiments. For example, the shape memory material(s) incorporated into the rod bodies of the present disclosure will inherently self-act to return to or toward a pre-set or fixed natural position or shape following removal of an applied load, thus generating an additional back force as compared to conventional fishing rods. This additional back force, in turns, lessens the level of force required by the user to retrieve a caught fish.

Alternatively or in addition, the fishing rods, and in particular rod bodies, of the present disclosure can decrease the likelihood of a caught fish releasing from the line as compared to conventional fishing rods in some embodiments. As a point of reference, one of the difficulties in reeling in a caught fish is that the fish will oftentimes jump out of the water and shake or swim rapidly toward the rod. These actions, in turn, temporarily released the force applied by the fish onto the hook and, as a result, the fish will release from the hook before being reeled in. The shape memory material(s) incorporated into the rod bodies of the present disclosure will inherently self-act to return to or toward a pre-set or fixed natural position or shape, thus applying a continuous force onto the line as a fish is being reeled in, thereby decreasing the likelihood that a motion of the fish will cause the fish to release from the hook.

Some of the fishing rods, and in particular rod bodies, of the present disclosure provide a marked improvement over conventional carbon fiber constructions that while highly sensitive and responsive, are prone to breaking or fracturing. The addition of metal, metal alloy, or other shape memory material in accordance with some embodiments of the present disclosure allow small tubing or rod shafts to maintain responsiveness and sensitivity but with increased durability that overtly resists breaking.

BRIEF DESCRIPTION OF THE DRAWINGS

FIG. 9A is a simplified side exploded view of a rod body in accordance with principles of the present disclosure and useful with the fishing rod of FIG. 1;

FIG. 9B is a simplified cross-sectional view of the rod body of FIG. 9A upon final assembly;

FIG. 10A is a simplified side exploded view of a rod body in accordance with principles of the present disclosure and useful with the fishing rod of FIG. 1;

FIG. 10B is a simplified side view of the rod body of FIG. 10A upon final assembly;

DETAILED DESCRIPTION

Figure 1:
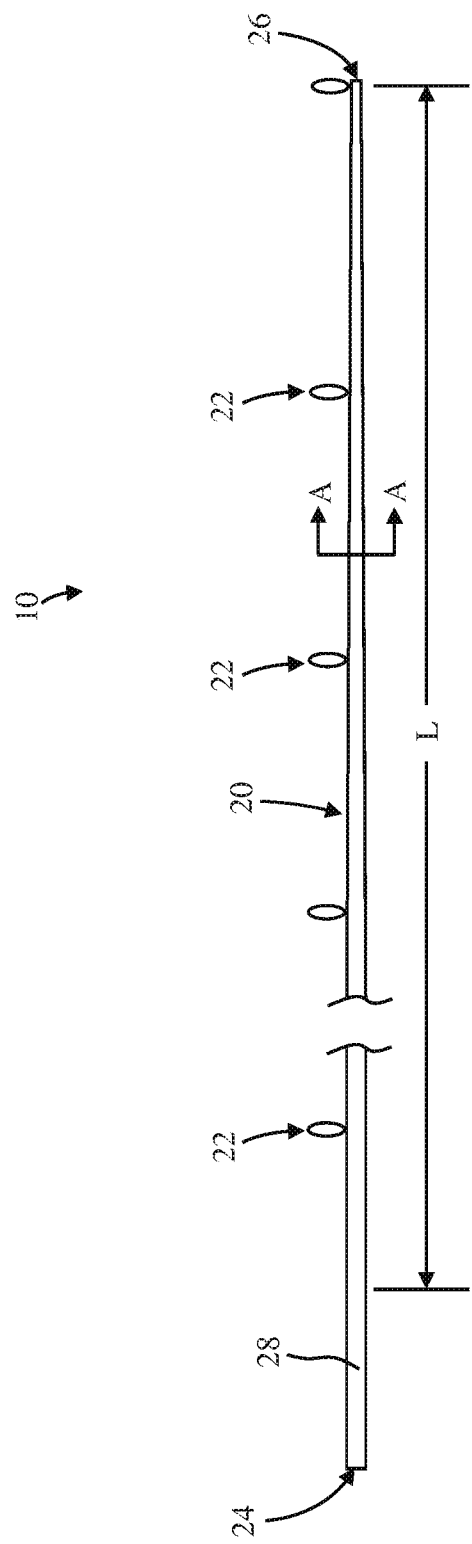
FIG. 1 is a simplified side view of a fishing rod in accordance with principles of the present disclosure.

Some aspects of the present disclosure are directed to fishing rods. One example of a fishing rod 10 in accordance with principles of the present disclosure is shown in FIG. 1. The fishing rod 10 includes a rod body 20 and optionally one or more guides 22. The rod body 20 extends from a handle or grip end 24 to a tip end 26. A handle or grip region 28 adjacent the handle end 24 is generally configured to receive a reel (not shown) as is known in the art. The rod body 20 can be provided as a singular, uninterrupted component, or can consist of two (or more) rod body sections that are separately formed and subsequently assembled. Regardless, a diameter (or maximum transverse dimension with embodiments in which the rod body 20 has a non-circular cross-sectional construction) of the rod body 20 generally tapers from the handle region 28 toward the tip end 26, and a working length L is defined from the handle region 28 to the tip end 26. The line guides 22 are of a type known in the art (e.g., metal rings) attached to and projecting from the rod body 20. Any number of line guides 22 can be provided. The line guides 22 can be spaced at various distances along the rod body 20, and are generally aligned with one another at one "side" of the rod body 20. In some embodiments, a location of the line guides 22 is at a "forward" side of the rod body 20. When provided as part of a fishing rod and reel assembly, a reel (not shown) is attached to the handle region 28 and a fishing line (not shown) wound about the reel is threaded through the line guides 22. A leading end of the fishing line extends beyond the line guide 22 at the tip end 26 and is fastened to a hook, lure, etc. In yet other embodiments, the fishing rods of the present disclosure can have an internal line guide format (e.g., at least a portion of the rod body 20 is hollow, and the fishing line is interiorly fed through the rod body 20 to the tip end 26); with these and similar embodiments, the line guides 22 can be omitted. Further, the fishing rods of the present disclosure can incorporate various features known in the art appropriate for a particular end use application (e.g., a spinning rod (used with a spinning reel), a casting rod (used with a casting reel), a baitcasting rod (used with a baitcasting reel), etc.).

With the above in mind, in some embodiments at least a portion of the rod body 20 includes or comprises a shape memory material, for example in the form of a shape memory member that is comprised of a shape memory material. Various embodiments of a shape memory member incorporated into the rod body 20 are described below. In more general terms, the shape memory member extends along at least a portion of the working length L, optionally along an entirety of the working length L, and promotes a desired level of flexibility and responsiveness to the rod body 20, including the rod body 20 more consistently maintaining and returning to a desired longitudinal shape or bend with the application and removal of a load at the tip end 26, optionally in the presence of an external stimulus (e.g., heat). The shape memory members of the present disclosure are characterized by an ability to deflect or change from a predetermined, natural or normal shape in response to an applied load, and to self-return to or toward the predetermined, natural or normal shape upon removal of the applied load. Shape memory materials of the present disclosure can include a shape memory metal or metal alloy, such as titanium, titanium alloy, nickel-titanium alloys (e.g., NiTi™ or Nitinol™), aluminum, aluminum alloy, iron, iron alloy, steel, chromium, chromium alloy, cobalt, cobalt alloy, platinum, platinum alloy, copper-zinc-aluminum alloys, copper-aluminum-nickel alloys, iron-manganese-silicon alloys, etc. Other shape memory materials of the present disclosure can include a shape memory polymer (e.g., linear block copolymer such a polyurethanes, etc.). The shape memory members of the present disclosure can be provided as a singular structural component, or can be incorporated into a composite structure such as a fiber reinforced polymer composite containing a thin shape memory member (metal, metal alloy, or thin shape memory polymer), a shape memory alloy embedded into a fiber material such as carbon fiber or fiber glass, etc. In yet other embodiments, the shape memory material can be combined with other materials to form the rod body 20 or a portion thereof (e.g., the rod body 20, or a segment thereof, can be formed as a mixture of a conventional fishing rod body fiber material (e.g., carbon fibers) and shape memory material fibers (e.g., Nitinol fibers)). In the descriptions below, reference to a "shape memory member" is inclusive of any structure incorporating or including a shape memory material as described above. In other embodiments of the present disclosure, the "shape memory member" need not include a material conventionally termed a "shape memory material", but instead is a metal such as steel (e.g., spring steel) or titanium. For example, in some embodiments, the "shape memory member" is a metal, or a combination of carbon fiber or fiberglass with metal.

Figure 2A:
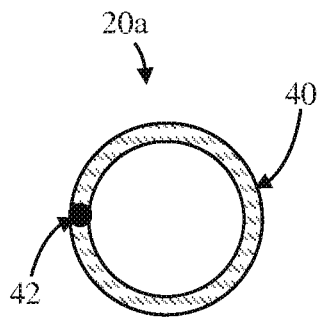
FIG. 2A is a simplified cross-sectional view of a rod body in accordance with principles of the present disclosure and useful with the fishing rod of FIG. 1.

Portions of one embodiment of a rod body 20a in accordance with principles of the present disclosure are shown in cross-section (along the line A-A of FIG. 1) in FIG. 2A. The rod body 20a includes a shaft 40 and a shape memory member 42. The shaft 40 can be a tubular body as shown; in other embodiments, the shaft 40 is solid. The shaft 40 can have a construction akin to a conventional fishing rod body, such as carbon fiber material, fiber glass material, urethane material, etc. The shape memory member 42 can have a rod-like shape and is embedded into a thickness of the shaft 40. The shape memory member 42 can extend along a portion or an entirety of the working length L (FIG. 1).

Figure 2B:
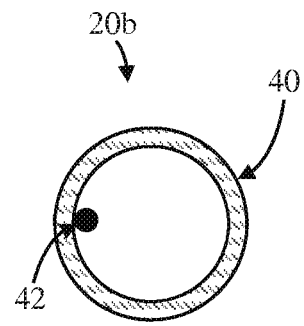
FIG. 2B is a simplified cross-sectional view of a rod body in accordance with principles of the present disclosure and useful with the fishing rod of FIG. 1.

Portions of another embodiment of a rod body 20b in accordance with principles of the present disclosure are shown in cross-section (along the line A-A of FIG. 1) in FIG. 2B. The rod body 20b includes the shaft 40 and the shape memory member 42 as described above (e.g., the shape memory member 42 can have a rod-like shape). With the embodiment of FIG. 2B, the shape memory member 42 is secured (e.g., adhered, bonded, molded, etc.) to an interior surface of the shaft 40. The shape memory member 42 can extend along a portion or an entirety of the working length L (FIG. 1).

Figure 3A:
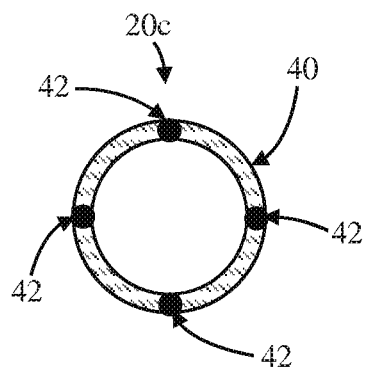
FIG. 3A is a simplified cross-sectional view of a rod body in accordance with principles of the present disclosure and useful with the fishing rod of FIG. 1.

Portions of another embodiment of a rod body 20c in accordance with principles of the present disclosure are shown in cross-section (along the line A-A of FIG. 1) in FIG. 3A. The rod body 20c includes the shaft 40 and a plurality of the shape memory members 42 as described above (e.g., the shape memory members 42 can have a rod-like shape). With the embodiment of FIG. 3A, each of the plurality of shape memory members 42 are embedded into a thickness of the shaft 40. The shape memory members 42 can each extend along a portion or an entirety of the working length L (FIG. 1); one or more of the shape memory members 42 can have different lengths. While four of the shape memory members 42 are shown, any other number, either greater or lesser, is also acceptable. While the shape memory members 42 are shown as being equidistantly spaced from one other (about a circumference of the shaft 40), in other embodiments, the shape memory members 42 are non-uniformly positioned relative to one another.

Figure 3B:
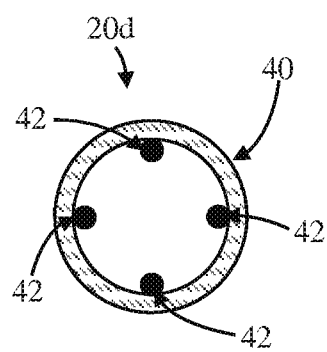
FIG. 3B is a simplified cross-sectional view of a rod body in accordance with principles of the present disclosure and useful with the fishing rod of FIG. 1.

Portions of another embodiment of a rod body 20d in accordance with principles of the present disclosure are shown in cross-section (along the line A-A of FIG. 1) in FIG. 3B. The rod body 20d includes the shaft 40 and a plurality of the shape memory members 42 as described above (e.g., the shape memory members 42 can have a rod-like shape). With the embodiment of FIG. 3B, each of the plurality of shape memory members 42 are secured (e.g., adhered, bonded, molded, etc.) to an interior surface of the shaft 40. The shape memory members 42 can each extend along a portion or an entirety of the working length L (FIG. 1); one or more of the shape memory members 42 can have different lengths. While four of the shape memory members 42 are shown, any other number, either greater or lesser, is also acceptable. While the shape memory members 42 are shown as being equidistantly spaced from one other (about a circumference of the shaft 40), in other embodiments, the shape memory members 42 are non-uniformly positioned relative to one another.

Figure 4A:
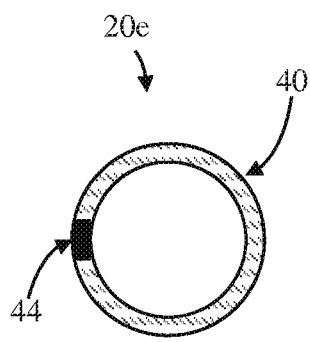
FIG. 4A is a simplified cross-sectional view of a rod body in accordance with principles of the present disclosure and useful with the fishing rod of FIG. 1.

Portions of another embodiment of a rod body 20e in accordance with principles of the present disclosure are shown in cross-section (along the line A-A of FIG. 1) in FIG. 4A. The rod body 20e includes the shaft 40 as described above and a shape memory member 44. The shape memory member 44 can have a band-like shape (e.g., non-circular in cross-section) and is embedded into a thickness of the shaft 40. The shape memory member 44 can extend along a portion or an entirety of the working length L (FIG. 1).

Figure 4B:
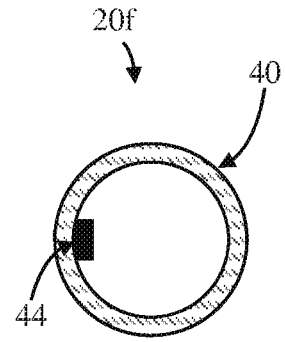
FIG. 4B is a simplified cross-sectional view of a rod body in accordance with principles of the present disclosure and useful with the fishing rod of FIG. 1.

Portions of another embodiment of a rod body 20f in accordance with principles of the present disclosure are shown in cross-section (along the line A-A of FIG. 1) in FIG. 4B. The rod body 20f includes the shaft 40 and the shape memory member 44 as described above (e.g., the shape memory member 44 can have a band-like shape). With the embodiment of FIG. 4B, the shape memory member 44 is secured (e.g., adhered, bonded, molded, etc.) to an interior surface of the shaft 40. The shape memory member 44 can extend along a portion or an entirety of the working length L (FIG. 1).

Figure 5A:
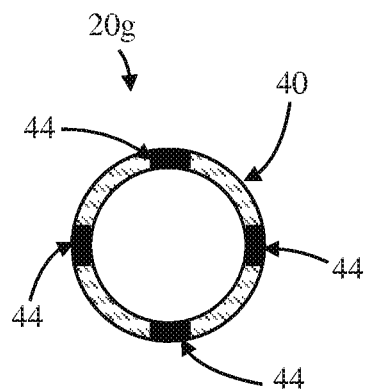
FIG. 5A is a simplified cross-sectional view of a rod body in accordance with principles of the present disclosure and useful with the fishing rod of FIG. 1.

Portions of another embodiment of a rod body 20g in accordance with principles of the present disclosure are shown in cross-section (along the line A-A of FIG. 1) in FIG. 5A. The rod body 20g includes the shaft 40 and a plurality of the shape memory members 44 as described above (e.g., the shape memory members 44 can have a band-like shape). With the embodiment of FIG. 5A, each of the plurality of shape memory members 44 are embedded into a thickness of the shaft 40. The shape memory members 44 can each extend along a portion or an entirety of the working length L (FIG. 1); one or more of the shape memory members 44 can have different lengths. While four of the shape memory members 44 are shown, any other number, either greater or lesser, is also acceptable. While the shape memory members 44 are shown as being equidistantly spaced from one other (about a circumference of the shaft 40), in other embodiments, the shape memory members 44 are non-uniformly positioned relative to one another.

Figure 5B:
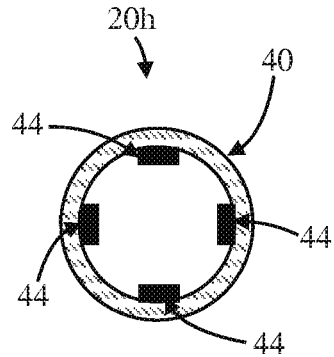
FIG. 5B is a simplified cross-sectional view of a rod body in accordance with principles of the present disclosure and useful with the fishing rod of FIG. 1.

Portions of another embodiment of a rod body 20h in accordance with principles of the present disclosure are shown in cross-section (along the line A-A of FIG. 1) in FIG. 5B. The rod body 20h includes the shaft 40 and a plurality of the shape memory members 44 as described above (e.g., the shape memory members 44 can have a band-like shape). With the embodiment of FIG. 5B, each of the plurality of shape memory members 44 are secured (e.g., adhered, bonded, molded, etc.) to an interior surface of the shaft 40. The shape memory members 44 can each extend along a portion or an entirety of the working length L (FIG. 1); one or more of the shape memory members 44 can have different lengths. While four of the shape memory members 44 are shown, any other number, either greater or lesser, is also acceptable. While the shape memory members 44 are shown as being equidistantly spaced from one other (about a circumference of the shaft 40), in other embodiments, the shape memory members 44 are non-uniformly positioned relative to one another.

Figure 6:
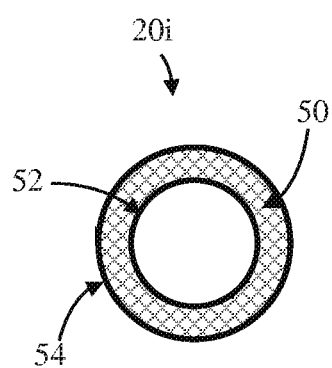
FIG. 6 is a simplified cross-sectional view of a rod body in accordance with principles of the present disclosure and useful with the fishing rod of FIG. 1.

Portions of another embodiment of a rod body 20i in accordance with principles of the present disclosure are shown in cross-section (along the line A-A of FIG. 1) in FIG. 6. The rod body 20i includes a shape memory member 50, an inner coating 52 and an outer coating 54. The shape memory member 50 can be a braided or coiled shape memory material (e.g., braided or coiled Nitinol™), and is optionally formed to a tubular shape. The inner and outer coatings 52, 54 are applied to the shape memory member 50 and can be a carbon fiber material, a fiberglass material, a urethane material, etc. The coatings 52, 54 serve to protect the shape memory member 50 and serve to retain the shape memory member 50 in the tubular format. In related embodiments, the wall of the rod body 20i is made of a braided shape memory material or braided shape memory material embedded within another material such as urethane. Alternatively, the wall can just be made of the braid without one or both of the inner coating 52 and/or the outer coating 54. In yet other embodiments, the rod body 20i is formed by an electroplated or welded braided mesh and fixed, for example, into an elongated tapered shape. In yet other embodiments, the rod body 20i can have a more solid construction in transverse cross-section (e.g., is not a tube), with the shape memory member 50 being a braided or coiled shape memory material that may or may not be covered by the outer coating 54.

Figure 7:
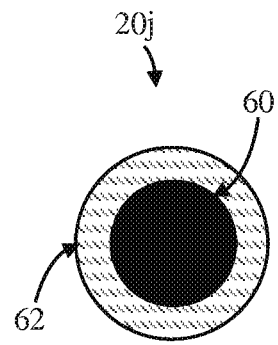
FIG. 7 is a simplified cross-sectional view of a rod body in accordance with principles of the present disclosure and useful with the fishing rod of FIG. 1.

Portions of another embodiment of a rod body 20j in accordance with principles of the present are shown in cross-section (along the line A-A of FIG. 1) in FIG. 7. The rod body 20j includes a shape memory member 60 and a coating 62. The shape memory member 60 serves as a core of the rod body 20j, and can be a solid body of shape memory material extending along a portion, or entirety, of the working length L (FIG. 1). The shape memory member 60 can have the generally cylindrical shape as reflected by FIG. 7. The coating 62 is applied to an exterior of the shape memory member 60 and can be a carbon fiber material, a fiberglass material, a urethane material, etc., serving to protect the shape memory member 60. In some embodiments, a thickness of the coating 62 can taper in a direction of the tip end 26 (FIG. 1). For example, the shape memory member 60 can have a constant or uniform diameter, with the thickness of the coating 62 tapering to mimic the tapering shape of a conventional fishing rod.

Figure 8:
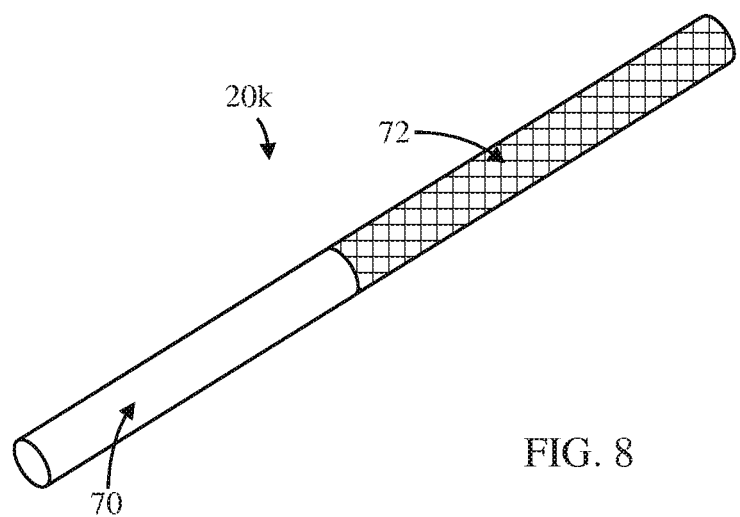
FIG. 8 is a simplified perspective view of a portion of a rod body in accordance with principles of the present disclosure and useful with the fishing rod of FIG. 1.

Portions of another embodiment of a rod body 20k in accordance with principles of the present disclosure are shown in FIG. 8. The rod body 20k includes a shaft 70 and a shape memory member 72 (referenced generally). The shaft 70 can be a tubular body; in other embodiments, the shaft 70 is solid. The shaft 70 can have a construction akin to a conventional fishing rod body, such as carbon fiber material, fiber glass material, urethane material, etc. The shape memory member 72 can be a shape memory material in the form of a wire or braid (e.g., a Nitinol™ wire or braid) that is wrapped or wound about the shaft 70. The shape memory member 72 can be attached to the shaft 70 in various fashions implicated by the materials employed (e.g., welded, adhered, bonded, mechanical attachment, etc.). The shape memory member 72 can be applied along an entire length of the shaft 70 (e.g., extending along an entirety of the working length L (FIG. 1), or can be applied to one more selected portions of the shaft 70. While the shape memory member 72 is shown as having been applied to an exterior of the shaft 70, in other embodiments, the shape memory member 72 can be disposed along or at an interior of the shaft 70.

Portions of another embodiment of a rod body 20l in accordance with principles of the present disclosure are shown in exploded from in FIG. 9A. The rod body 20l includes a shaft 80 and a shape memory member 82. The shaft 80 is a tubular body having the tapering shape as shown (e.g., tapering in a direction of the tip end 26 (FIG. 1)). The shaft 80 can have a construction akin to a conventional fishing rod body, such as carbon fiber material, fiber glass material, urethane material, etc. The shape memory member 82 is a sheet or film of shape memory material (e.g., Nitinol™ sheet or Nitinol™ film) that is wound or wrapped onto itself for insertion into the central passage of the shaft 80. Upon final assembly, and as illustrated in FIG. 9B, the wrapped shape memory member 82 is disposed within the shaft 80. The shape memory member 82 can extend along a portion of, or an entirety of, the working length L (FIG. 1). The shape memory member 82 can be secured to the shaft 80 in various manners commensurate with the materials employed (e.g., bonded, adhesive, welded, mechanical attachment, frictional connection, etc.).

Figure 10C:
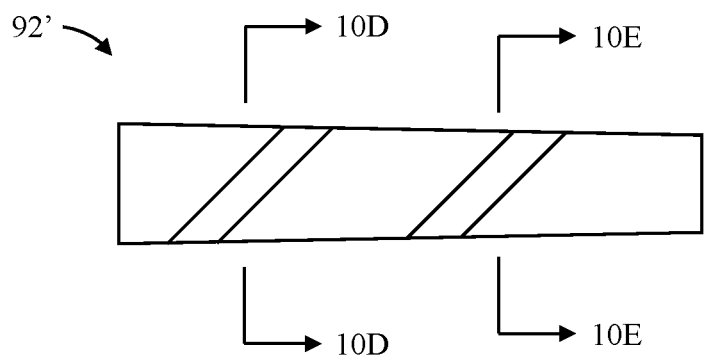
FIG. 10C is a simplified side view of a shape memory member in accordance with principles of the present disclosure.
Figure 10D:
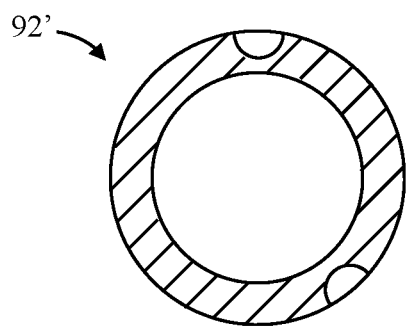
FIG. 10D is a cross-sectional view of the shape memory member of FIG. 10C, taken along the line 10D-10D.
Figure 10E:
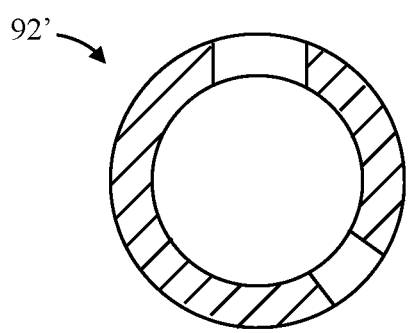
FIG. 10E is a cross-sectional view of the shape memory member of FIG. 10C, taken along the line 10E-10E.

Portions of another embodiment of a rod body 20m in accordance with principles of the present disclosure are shown in exploded from in FIG. 10A. The rod body 20m includes a shaft 90 and a shape memory member 92. The shaft 90 can be solid or tubular, and can have the tapering shape as shown (e.g., tapering in a direction of a tip region 94). The shaft 90 can have a construction akin to a conventional fishing rod body, such as carbon fiber material, fiber glass material, urethane material, etc. The shape memory member 92 is a tubular body of shape memory material or other metal that is sized and shaped for mounting over at least the tip region 94 of the shaft 90. Upon final assembly, and as illustrated in FIG. 10B, the shape memory member 92 is disposed over the shaft 90. The shape memory member 92 can extend along at least a portion of the tip region 94; in other embodiments, the shape memory member 92 can extend beyond the tip region 94, and optionally along an entirety of the working length L (FIG. 1). In some embodiments, the shape memory member 92 can have a length that is greater than 25% of the working length L; for example, the shape memory member 92 can have a length that is at least 30% of the working length L, alternatively at least 40% of the working length L, alternatively in the range of 30-100% of the working length L. It has surprisingly been found that by forming the shape memory member 92 to have a length that is greater than 25% of the working length L, performance characteristics implicated by the present disclosure are enhanced. While the shape memory member 92 is generally shown as being a complete, uniform tube (e.g., a continuous side wall with uniform thickness over 360 degrees, in other embodiments, the shape memory member 92 can be an incomplete or non-uniform tube (e.g., a shape memory member 92' of FIG. 10C can be a tube with non-uniform wall thickness as shown in FIG. 10D; a section of the tubular shape of the shape memory member 92' can be removed as shown in FIG. 10E; etc.). Returning to FIG. 10B, the shape memory member 92 can be secured to the shaft 90 in various manners commensurate with the materials employed (e.g., bonded, adhesive, welded, mechanical attachment, frictional connection, etc.).

Figure 11A:
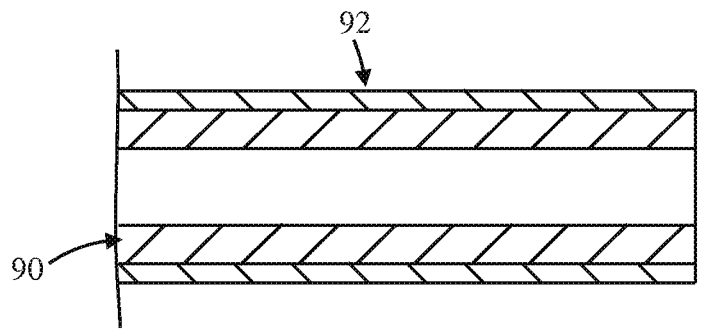
FIG. 11A is a simplified cross-sectional view of a portion of the rod body of FIG. 10B.
Figure 11B:
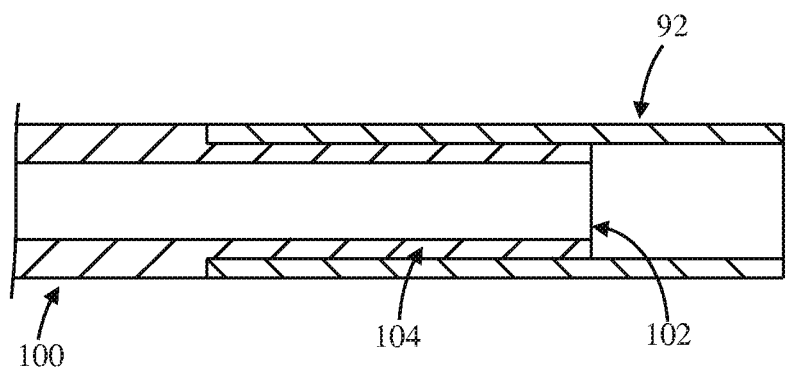
FIG. 11B is a simplified cross-sectional view of a portion of a rod body in accordance with principles of the present disclosure and useful with the fishing rod of FIG. 1.

The shape memory member 92 can have a tapered shape or can be akin to a right cylinder. As shown in FIG. 11A, the shaft 90 and the shape memory member 92 can be configured such that upon final assembly, an entirety of the shape memory member 92 nests against or contacts a surface or structure of the shaft 90. FIG. 11B illustrates an alternative embodiment of the shape memory member 92 assembled to a shaft 100. The shaft 100 can have any of the constructions described above (e.g., akin to a conventional fishing rod body such as carbon fiber material, fiber glass material, urethane material, etc.), and terminates at a shaft end 102. A receiving region 104 of the shaft 100 proximate the shaft end 102 has a reduced outer diameter, commensurate with an inner diameter of the shape memory member 92. Upon final assembly, the shape memory member 92 is mounted over the receiving region 104, with a portion of the shape memory member 92 extending beyond the shaft end 102. Thus, with these and other optional constructions, at least a portion of the shape memory member 92 is not directly in contact with or directly supported by the shaft 100. In some related embodiments, an outer diameter of the shape memory member 92 can be commensurate with an outer diameter of the shaft 100 immediately proximal the receiving region 104.

Figure 12:
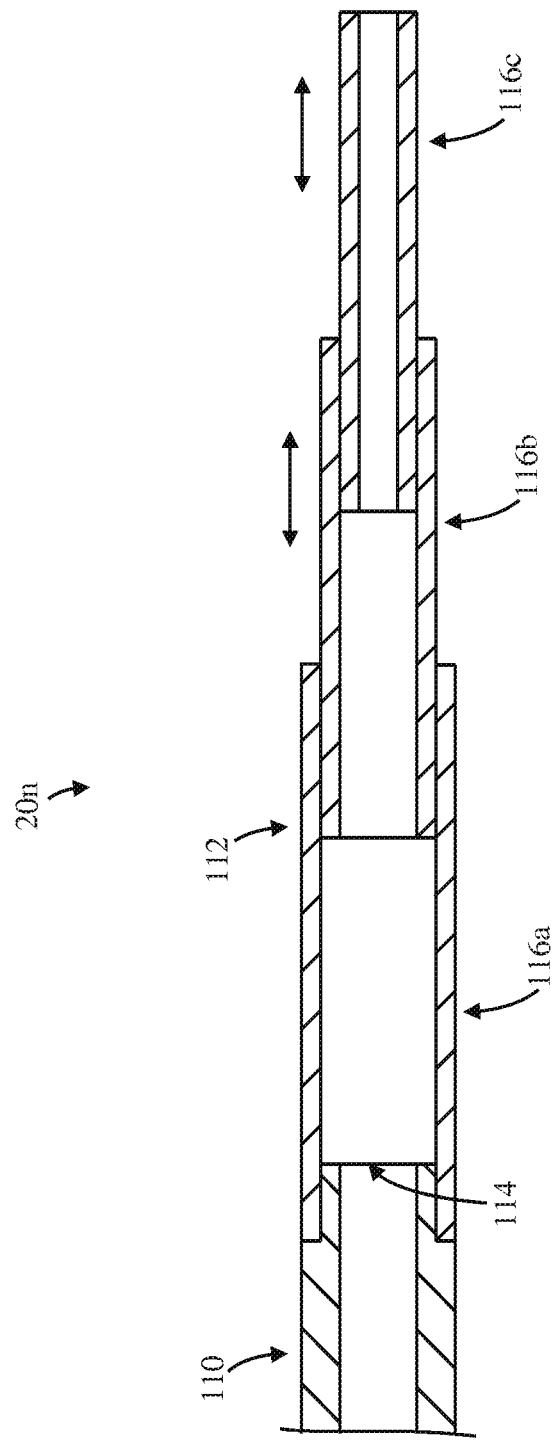
FIG. 12 is a simplified cross-sectional view of a portion of a rod body in accordance with principles of the present disclosure and useful with the fishing rod of FIG. 1.

Portions of a related embodiment rod body 20n are shown in FIG. 12, and includes a shaft 110 and a shape memory member assembly 112. The shaft 110 can be solid or tubular, and can have a tapering shape in a direction of a shaft end 114. The shaft 110 can have a construction akin to a conventional fishing rod body, such as carbon fiber material, fiber glass material, urethane material, etc. The shape memory member assembly 112 can include two or more shape memory members, such as shape memory members 116a, 116b, 116c. The first shape memory member 116a is assembled over the shaft end 114 as described above; the remaining shape memory members 116b, 116c are connecting to one another in a telescoping fashion (as indicated by arrows in FIG. 12). With these and related constructions, an overall length and/or responsiveness of the rod body 20n can be selected by a user by manipulating the shape memory members 116a-116c relative to one another.

With the embodiments of FIGS. 10A-12, the rod body 20m, 20n can be or include a tip on a thin inner carbon fiber shaft. The tip can be a nitinol tip, a metal tip, a nitinol with carbon fiber tip, or a metal with carbon fiber tip. The tip and/or the shaft can have a tapering shape or can have a telescoping design.

Figure 13:
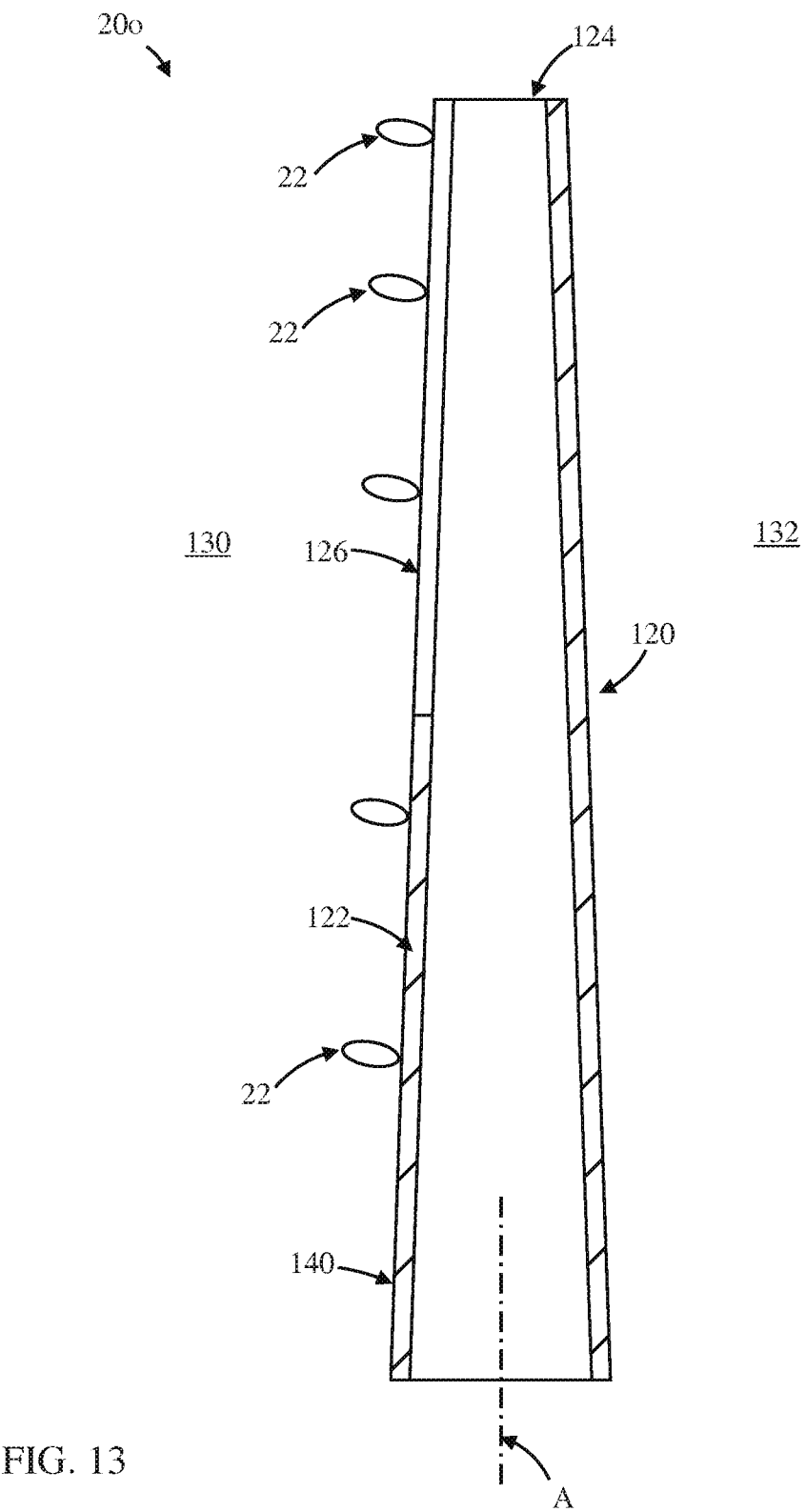
FIG. 13 is a simplified longitudinal cross-sectional view of a rod body in accordance with principles of the present disclosure.

In some embodiments, the rod bodies of the present disclosure are configured to exhibit differing flexibility or rigidity characteristics along opposing sides thereof. For example, the rod bodies 20a (FIG. 2A), 20b (FIG. 2B), 20e (FIG. 4A), and 20f (FIG. 4B) can exhibit reduced flexibility (or enhanced rigidity) along the "side" thereof at which the corresponding shape memory member 44 is located. Along these same lines, portions of another rod body 20o in accordance with principles of the present disclosure are shown in FIG. 13. The rod body 20o includes a shaft 120 and a shape memory member 122. The shaft 120 is a tubular or solid body having the tapering shape as shown (e.g., tapering in a direction of a tip end 124). The shaft 120 can have a construction akin to a conventional fishing rod body, such as carbon fiber material, fiber glass material, urethane material, etc. The shape memory member 122 can be comprised of any of the shape memory materials of the present disclosure, and can be secured to the shaft 120 in various manners (e.g., embedded into a thickness of the shaft 120, adhered or bonded or welded to a surface of the shaft 120, etc.). As indicated at 126, a segment 126 of the rod body 20o is characterized by the absence of the shape memory member 122; in other embodiments, the segment 126 can be defined by a shape memory member or material having differing rigidity characteristics as compared to other portions of (or an entirety of) the shape memory member 122. Regardless, an elongated shape of the shaft 120 (or the rod body 20o as a whole) defines a longitudinal axis A. The segment 126 is located at a first "side" 130 of the longitudinal axis A. Relative to a cross-sectional plane perpendicular to the longitudinal axis A and passing through the segment 126, the shape memory member 122 exists at an opposing, second "side" 132 of the longitudinal axis. With this and similar constructions, the shape memory member 122 is configured and positioned relative to the shaft 120 such that the rod body 20o exhibits a first degree of flexibility in a direction of the first side 130 relative to the longitudinal axis A and a second degree of flexibility in a direction of the second side 132 relative to the longitudinal axis A. The first direction is opposite the second direction, and the first degree of flexibility is greater than the second degree of flexibility.

As a point of reference, some anglers may desire certain fishing rod performance attributes in the context of a normal casting motion. The casting motion is generally viewed as having an initial, rearward motion in which the user applies a torque or moment force onto a handle region 140, causing the tip end 124 to move rearwardly, in a direction toward and then behind the user's body. At the end of the rearward motion, a forward motion is then effected in which the user applies an opposite direction torque or moment force onto the handle region 140, causing the tip end 124 to move forwardly, in direction forward (in front) of the user's body. As part of the forward motion, the reel (not shown) is operated to release the fishing line, thus launching or casting the hook, lure, bait, etc., forwardly away from the tip end 124 (and thus user). Relative to this casting motion, an orientation of the user's hand while grasping the handle region 140 and reel effectively defines which side 130, 132 primarily affects the rearward casting motion and the forward casting motion, and the orientation of the user's hand is dictated by a location and arrangement of the reel (not shown) and thus the line guides 22 (where provided). For example, where the rod body 20o is used with a spinning-type reel, as the fishing rod is naturally held by the user in a normal, forward fishing position, the reel (and the line guides 22) face downwardly. In other words, the first side 130 is "below" the second side 132. When casting with this so-constructed fishing rod and reel assembly, the rod body 20o is forced to a curved shape in a direction of the second side 132 during rearward motion (i.e., at the end of the rearward casting motion, the second side 132 defines a concave curve and the first side 130 defines a convex curve). An opposite curved shape is generated by the subsequent forward casting motion (i.e., at the end of the forward casting motion, the second side 132 defines a convex curve and the first side 130 defines a concave curve). Forming or locating the segment 126 of increased flexibility at the first side 130 may result in the rod body 20o more readily flexing in the rearward casting motion as compared to the forward casting motion. Where an opposite performance attribute is desired, the segment 126 of increased flexibility (or reduced rigidity) can instead be formed at the second side 132 of the rod body 20o (again, in the context of the rod body 20o being used with a spinning-type reel arranged at the first side 130). It will be understood that the descriptions above can be reversed in the context of other fishing rod and reel arrangements. For example, where the rod body 20o is used with a casting-type reel, as the fishing rod is naturally held by the user in a normal, forward fishing position, the reel (and the line guides 22) face upwardly. In other words, the first side 130 is "above" the second side 132.

In other, related embodiments, fishing rods of the present disclosure can include a locking feature or mechanism that prevents or limits the rod body from bending in one direction. For example, fly fishermen often desire that the rod body flex or curve appreciably during the rearward casting motion, but prefer that the rod body minimally flex or curve during the subsequent forward casting motion. Any of the rod bodies described above can format and/or locate the corresponding shape memory member(s) to promote this desired performance characteristic. Alternatively or in addition, a locking-type mechanism can be carried by or assembled to the rod body that permits flexing or curving in the rearward casting motion or direction, and limits flexing or curving in the forward casting motion or direction. For example, two strips of complimentary fastener materials (e.g., akin to cable tie or zip tie strips) can be applied to the side of the rod body that will assume a concave curvature during the rearward casting motion, arranged such that the strips readily slide relative to one another during the rearward casting motion, but become locked when the rod body is linear (e.g., at the "top" of the forward casting motion).

Figure 14:
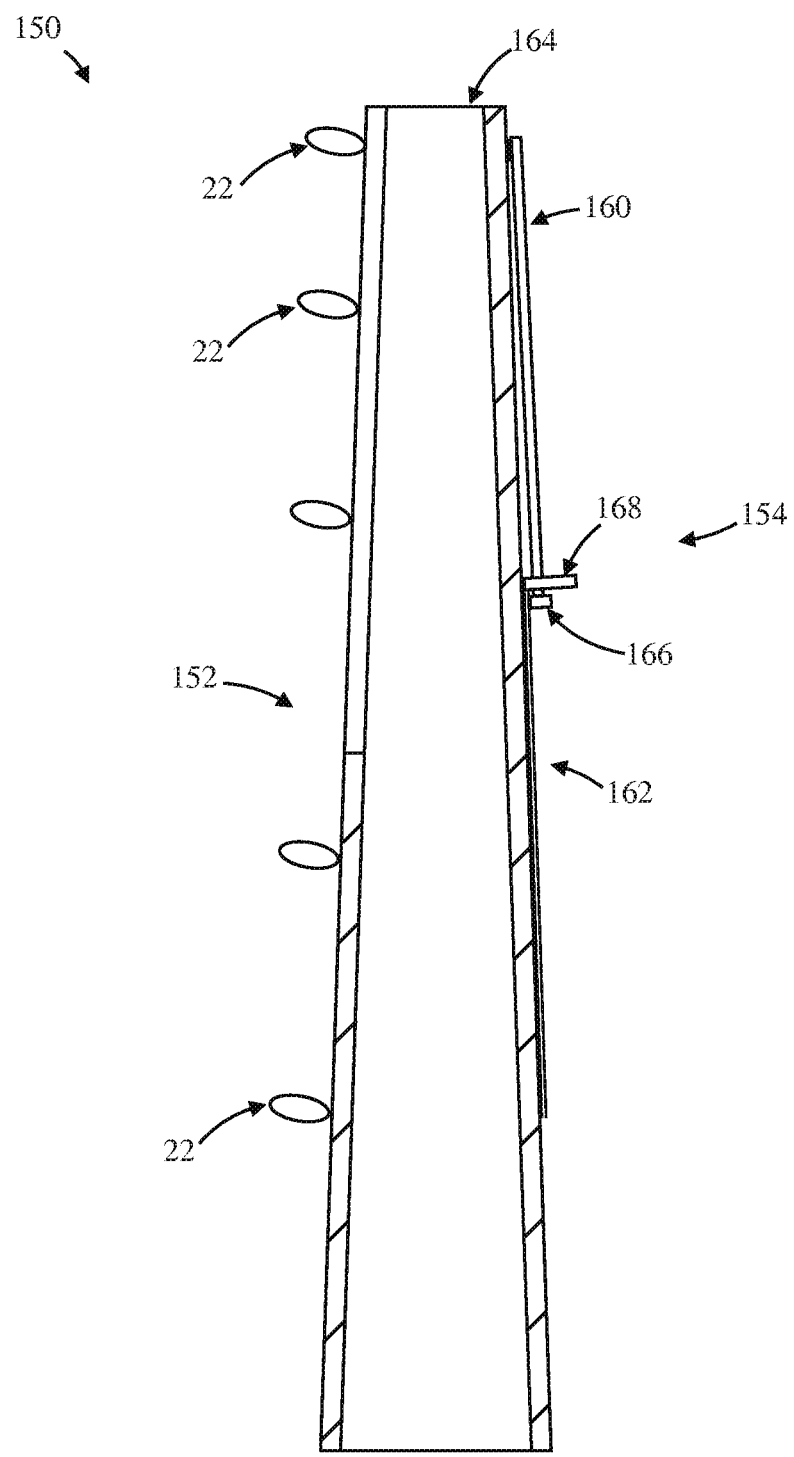
FIG. 14 is a simplified cross-section view of a fishing rod in accordance with principles of the present disclosure.

The locking features or mechanisms of the present disclosure can assume other configurations, for example as shown with the fishing rod 150 of FIG. 14. The fishing rod 150 includes a rod body 152, the optional line guides 22, and a locking mechanism 154. The rod body 152 can assume any of the forms described elsewhere in the present disclosure (e.g., can include a shape memory member as described above), and is not limited to the format reflected by FIG. 14. The locking mechanism 154 is mounted to the rod body 152 at a desired "side" (e.g., the side opposite the line guides 22 where the fishing rod 150 is used as a spinning rod (with a spinning-type reel (not shown)), and can include a leading member 160 and a trailing member 162. The leading member 160 is attached to the rod body 152 near a tip end 164, and extends from the point of attachment to a lock body 166. The trailing member 162 is attached to the rod body 152 opposite the leading member 160 and carries or forms a receiving body 168. The leading member 160 extends through a passage of the receiving body 168, with a shape or size of the lock body 166 being greater than that of the passage in the receiving body 168. With this construction, the leading member 160/lock body 166 are freely slidable relative to the trailing member 162/receiving body 168 in a first direction (e.g., downward relative to the orientation of FIG. 14). In an opposite direction, the lock body 166 is brought into abutment against the receiving body 168 to impede further movement.

Figure 15A:
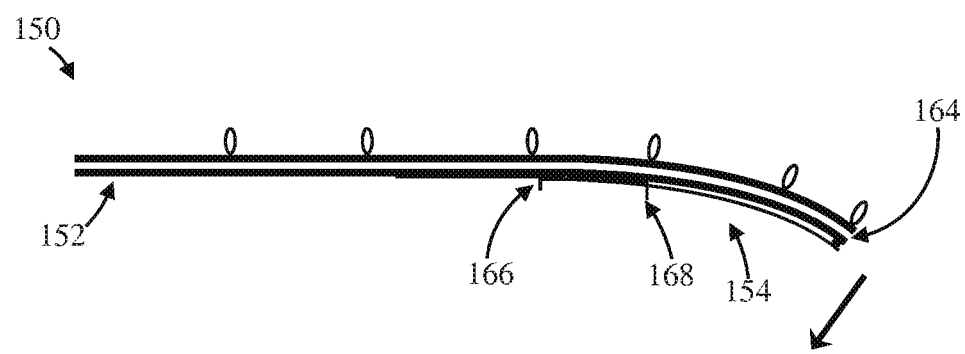
FIGS. 15A and 15B are simplified side views of the fishing rod of FIG. 14 in use.
Figure 15B:
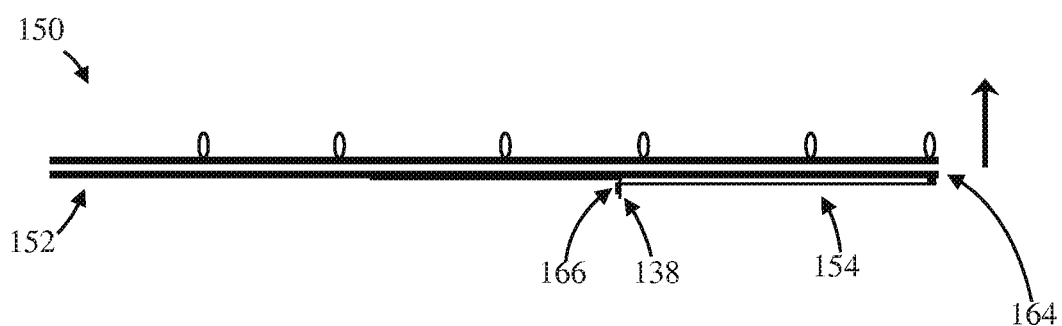

During use, when the fishing rod 150 is subjected to forces causing the rod body 152 to flex at the tip end 164 in the direction shown in FIG. 15A (e.g., back casting motion), the locking mechanism 154 permits the desired flexure, with the lock body 166 sliding away from the receiving body 168. When the fishing rod 150 is subsequently subjected to forces causing the rod body 152 to flex at the tip end 164 in the opposite direction (e.g., forward casting motion), the locking mechanism 154 impedes over deflection of the rod body 152. More particular, and as shown in FIG. 15B, as the rod body 152 reverts from the back cast flexed shape of FIG. 15A with forces applied at the tip end 164 reflected by the arrow in FIG. 15B, the lock body 166 slides into abutment against the receiving body 168 and prevents the rod body 152 from flexing or deflecting beyond the arrangement shown. In some embodiments, the locking mechanism 154 is configured to "hold" the rod body 152 in a nearly linear arrangement during the forward casting motion.

Although the present disclosure has been described with reference to preferred embodiments, workers skilled in the art will recognize that changes can be made in form and detail without departing from the spirit and scope of the present disclosure. For example, two or more of the rod body features described above can be combined into a single rod body. By way of non-limiting example, a rod body of the present disclosure can include a combination of a shape memory member tube assembled over the tip region of the shaft (e.g., the features of FIGS. 10A-11B) and a shape memory member braid secured to an exterior or interior of the shaft (e.g., the features of FIGS. 6-8); the two (or more) shape memory members can be provided at different regions of the shaft or at the same region.

What is claimed is:

1. A fishing rod comprising:
   a rod body extending from a handle end to a tip end, wherein the rod body comprises:
   a shaft; and
   a shape memory member including a shape memory material comprising a shape memory metal alloy and configured to self-return toward a normal shape upon removal of an applied load;
   wherein the shape memory member is formed apart from the shaft as a singular structural tubular body having a tubular shape with a section of the tubular shape removed to define an incomplete tube;
   wherein the tubular body defines an inner circumferential face opposite an outer circumferential face, and further wherein the section of the tubular shape removed to define an incomplete tube includes at least one opening defined through a wall thickness of the tubular body, the at least one opening extending between, and open to, the inner and outer circumferential faces, and further wherein the at least one opening is defined and circumscribed by a continuous, uninterrupted perimeter at the inner circumferential face and at the outer circumferential face;
   and further wherein the shape memory member is secured over the shaft and is permanently secured to the shaft by at least one of a bond and a weld.

2. The fishing rod of claim 1, wherein the shape memory member is attached to a surface of the shaft.

3. The fishing rod of claim 1, wherein the tubular body secured over a tip region of the shaft.

4. The fishing rod of claim 3, wherein a length of the shape memory member is at least 30% of a working length of the rod body.

5. The fishing rod of claim 3, wherein the shape memory member is exteriorly exposed along an exterior of the rod body.

6. The fishing rod of claim 3, wherein an outer diameter of the rod body at the tip end is defined by the shape memory member.

7. The fishing rod of claim 3, wherein the rod body is characterized by a uniformly tapering shape in extension to the tip end, and further wherein the shape memory member defines a portion of the uniformly tapering shape.

8. The fishing rod of claim 3, further comprising a line guide directly secured to an exterior of the shape memory member.

9. The fishing rod of claim 1, wherein the shape memory metal alloy is a nickel titanium alloy.

10. The fishing rod of claim 1, wherein the shape memory material further comprises a shape memory polymer.

11. The fishing rod of claim 1, wherein the rod body is formed by a mixture of carbon fibers and shape memory material fibers.

12. The fishing rod of claim 11, wherein the shape memory material fibers are nickel titanium alloy fibers.

13. The fishing rod of claim 1, wherein the tubular body is a non-uniform tube.

14. The fishing rod of claim 13, wherein the non-uniform tube has a non-uniform wall thickness.

15. The fishing rod of claim 1, wherein the at least one opening is located over the shaft.

16. The fishing rod of claim 1, wherein the at least one opening extends radially relative to a longitudinal axis of the tubular body.

17. The fishing rod of claim 1, wherein an entirety of the tubular body is disposed over the shaft.

18. The fishing rod of claim 1, wherein the at least one opening comprises a plurality of openings, each of the plurality of openings extending between, and open to, the inner and outer circumferential faces and wherein each of the plurality of openings are defined by and circumscribed by a corresponding continuous, uninterrupted perimeter.

19. The fishing rod of claim 1, wherein the tubular body terminates at a first end opposite a second end, and further wherein a diameter of the tubular body at the outer circumferential face is uniform in extension from the first end to the second end.

* * * * *